(12) United States Patent
Jacqus et al.

(10) Patent No.: US 11,788,282 B2
(45) Date of Patent: Oct. 17, 2023

(54) MINERAL WOOL ACOUSTIC PANEL AND PROCESS FOR MANUFACTURING SUCH A PANEL

(71) Applicants: SAINT-GOBAIN ISOVER, Courbevoie (FR); SAINT-GOBAIN PLACO, Courbevoie (FR)

(72) Inventors: Gary Jacqus, Paris (FR); Sylvain Berger, Paris (FR); Pierre Leroy, Saint Félix (FR); Erling Nilsson, Lund (SE); Delphine Dray, Pantin (FR)

(73) Assignees: SAINT-GOBAIN ISOVER, Courbevoie (FR); SAINT-GOBAIN PLACO, Courbevoie (FR)

( * ) Notice: Subject to any disclaimer, the term of this patent is extended or adjusted under 35 U.S.C. 154(b) by 646 days.

(21) Appl. No.: 16/755,464

(22) PCT Filed: Oct. 12, 2018

(86) PCT No.: PCT/EP2018/077819
§ 371 (c)(1),
(2) Date: Apr. 10, 2020

(87) PCT Pub. No.: WO2019/073020
PCT Pub. Date: Apr. 18, 2019

(65) Prior Publication Data
US 2020/0240137 A1    Jul. 30, 2020

(30) Foreign Application Priority Data
Oct. 13, 2017  (EP) .................................... 17196308

(51) Int. Cl.
*E04B 1/84*    (2006.01)
*C03B 37/04*   (2006.01)
(Continued)

(52) U.S. Cl.
CPC ............ *E04B 1/8409* (2013.01); *C03B 37/04* (2013.01); *D04H 1/4218* (2013.01);
(Continued)

(58) Field of Classification Search
CPC ................ E04B 1/8409; D04H 1/4218; D10B 2401/063; G10K 11/162; G10K 11/172; C03B 37/04
See application file for complete search history.

(56) References Cited

U.S. PATENT DOCUMENTS 5,032,334 A * 7/1991 Jonsson ................. D04H 1/732
425/81.1
5,348,621 A * 9/1994 Rudy ...................... C08B 15/02
162/158
(Continued)

FOREIGN PATENT DOCUMENTS

EP        0412878 A1 *  2/1991
EP     1 743 076 B1    10/2012
(Continued)

OTHER PUBLICATIONS

English translation of WO-2013057432-A1, accessed from SEARCH tool on Sep. 9, 2022 (Year: 2013).*
(Continued)

*Primary Examiner* — Jeremy A Luks
(74) *Attorney, Agent, or Firm* — Pillsbury Winthrop Shaw Pittman LLP

(57) ABSTRACT

A mineral wool panel, intended to be used as an acoustic panel, has a surface density of greater than or equal to 3.2 kg/m$^2$, an air flow resistivity of between 30 and 120 kPa·s/m$^2$, and a Young's modulus of between 0.5 and 4 MPa.

20 Claims, 2 Drawing Sheets

(51) Int. Cl.
 *D04H 1/4218* (2012.01)
 *G10K 11/162* (2006.01)
 *G10K 11/172* (2006.01)

(52) U.S. Cl.
 CPC ...... *D10B 2401/063* (2013.01); *G10K 11/162* (2013.01); *G10K 11/172* (2013.01)

(56) References Cited

U.S. PATENT DOCUMENTS

| | | | |
|---|---|---|---|
| 2004/0121114 A1* | 6/2004 | Piana | D06M 11/70 427/372.2 |
| 2011/0111198 A1* | 5/2011 | Letourmy | D04H 1/4226 428/221 |
| 2014/0319721 A1* | 10/2014 | Celle | D04H 3/004 34/635 |
| 2016/0200069 A1* | 7/2016 | Alengrin | D04H 1/74 428/167 |
| 2020/0232133 A1* | 7/2020 | Bush | D04H 1/4218 |
| 2022/0100934 A1* | 3/2022 | Katsura | G06F 30/17 |

FOREIGN PATENT DOCUMENTS

| | | | |
|---|---|---|---|
| FR | 2 857 900 A1 | 1/2005 | |
| FR | 2 928 146 A1 | 9/2009 | |
| FR | 2996565 A1 * | 4/2014 | ............... B27N 3/04 |
| WO | WO 2005/095727 A1 | 10/2005 | |
| WO | WO-2013057432 A1 * | 4/2013 | ............ C03C 13/06 |

OTHER PUBLICATIONS

English translation of FR-2996565-A1, accessed from SEARCH tool on Sep. 9, 2022 (Year: 2014).*
English translation of FR-2857900-A1, accessed from SEARCH tool on Sep. 9, 2022 (Year: 2005).*
English translation of EP-0412878-A1, accessed from SEARCH tool on Sep. 9, 2022 (Year: 1991).*
International Search Report as issued International Patent Application No. PCT/EP2018/077819, dated Dec. 12, 2018.
Langlois, C., et al., "Polynomial relations for quasi-static mechanical characterization of isotropic poroelastic materials," J. Acoust. Soc. Am. 110 (6), Dec. 2001, pp. 3032-3040.

* cited by examiner

MINERAL WOOL ACOUSTIC PANEL AND PROCESS FOR MANUFACTURING SUCH A PANEL

CROSS-REFERENCE TO RELATED APPLICATIONS

This application is the U.S. National Stage of PCT/EP2018/077819, filed Oct. 12, 2018, which in turn claims priority to European patent application number 17196308.5 filed Oct. 13, 2017. The content of these applications are incorporated herein by reference in their entireties.

The invention relates to a mineral wool panel intended to be used as an acoustic panel, for example in a suspended ceiling system.

A mineral wool acoustic panel is known from document EP 1 743 076 which is crimped then split through the thickness and abraded. The front face (the one intended to be facing the side from where the sound to be absorbed originates) is the cut and abraded face, which comes from the center of the panel before cutting. The fibers of this surface and in the vicinity of this surface have a preferential orientation along the Z direction. The sound absorption $\alpha_w$ is greater than or equal to 0.7. Cutting through the thickness and abrading are steps which increase the manufacturing time and which are a source of waste production, which results in costs.

There is therefore a need for a panel produced without cutting that has acoustic properties which are as good, or even better.

For this, the invention proposes a mineral wool panel intended to be used as an acoustic panel and having:

- a surface density of greater than or equal to 3.2 kg/m$^2$, preferably greater than or equal to 4 kg/m$^2$, or else greater than or equal to 4.5 kg/m$^2$, or greater than or equal to 5 kg/m$^2$,
- an air flow resistivity of between 30 and 120 kPa·s/m$^2$, preferably of between 50 and 110 kPa·s/m$^2$, or of between 50 and 100 kPa·s/m$^2$, or else of between 50 and 90 kPa·s/m$^2$, or of between 50 and 80 kPa·s/m$^2$, and
- a Young's modulus of between 0.5 and 4 MPa, preferably of between 0.8 and 4 MPa, more preferably still of between 1.2 MPa and 4 MPa, or of between 1.5 MPa and 4 MPa, or else of between 2 MPa and 4 MPa, and the panel not being cut through the thickness along a plane substantially parallel to its main faces.

According to another distinctive feature, the panel has a micronaire of between 2.5/5 g and 6/5 g, preferably between 3/5 g and 6/5 g, or between 3.5/5 g and 6/5 g, or else between 4/5 g and 5/5 g or a fasonaire of between 200 and 300, preferably between 200 and 290, or between 200 and 280, or else between 200 and 270.

According to another distinctive feature, the panel additionally comprises a veil on each of its main faces.

According to another distinctive feature, the veil intended to be facing the side from where the sound to be absorbed originates having a specific air flow resistance of less than or equal to 1 kPa·s/m, preferably less than or equal to 0.5 kPa·s/m, and the opposite veil having a specific air flow resistivity of greater than or equal to 1 kPa·s/m, preferably greater than or equal to 5 kPa·s/m, or even greater than or equal to 10 kPa·s/m, or else airtight.

According to another distinctive feature, the panel comprises a weight content of binder of between 2% and 15% of the total weight, preferably between 2% and 10% of the total weight.

According to another distinctive feature, the panel has a sound absorption $\alpha_w$ of greater than or equal to 0.9.

According to another distinctive feature, the panel has a sound insulation $D_{nfw}$ of greater than or equal to 38 dB, preferably greater than or equal to 39 dB, or greater than or equal to 40 dB, or else greater than or equal to 41 dB, or greater than or equal to 42 dB.

The invention also relates to a process for manufacturing the mineral wool panel described above, comprising the following steps:

manufacturing a mat of mineral fibers by:
- internal centrifugation for glass fibers, using equipment comprising:
  - at least one centrifuge capable of rotating about an axis X, in particular a vertical axis, and the peripheral band of which is pierced by a plurality of orifices for delivering filaments of a molten material,
  - a high-temperature gas attenuating means in the form of an annular burner that attenuates the filaments into fibers, and
  - a receiving belt associated with suction means for receiving the fibers, or
- external centrifugation for rock fibers, using equipment comprising:
  - at least three rotors capable of rotating about an axis Y, in particular a horizontal axis, and the contact of which with the molten material makes it possible to deliver fibers, and
  - a receiving belt associated with suction means for receiving the fibers, crimping the mat of mineral fibers with a degree of crimping of between 1.5 and 5, preferably of between 2 and 5, or of between 2.5 and 5, or else of between 3 and 5.

According to another distinctive feature, during the step of manufacturing the mat of glass fibers, a combination of parameters is regulated, from among at least:
- the viscosity of the molten glass, which is between 820 and 1500 poise, preferably between 950 and 1200 poise,
- the pressure of the burner, which is between 200 and 1000 mm WC, preferably between 200 and 600 mm WC,
- the total daily output of glass per centrifuge, which is between 14 metric tonnes/day and 23 metric tonnes/day, preferably between 17 and 22 metric tonnes/day,
- the number of holes of each centrifuge, which is between 5000 and 40 000, preferably between 15 000 and 35 000, and
- the rotational speed of the centrifuge at a speed greater than 2000 revolutions/minute.

According to another distinctive feature, the diameter of the orifices of each centrifuge is between 0.5 and 1.1 mm.

According to another distinctive feature, each centrifuge has a diameter of between 200 and 800 mm.

According to another distinctive feature, during the step of manufacturing the mat of rock fibers, a combination of parameters is regulated, from among at least:
- the total daily output of rock, which is between 100 and 250 metric tonnes/day,
- the rotational speed of the rotors, which is between 2000 and 4000 revolutions/m in.

According to another distinctive feature, each rotor has a diameter of between 150 mm and 350 mm.

According to another distinctive feature, binder is projected onto the mineral fibers before they fall onto the receiving belt, with a content of between 2% and 15% of the total weight, preferably of between 2% and 10% of the total weight, the mat of mineral fibers being passed into a drying oven, preferably after crimping, in order to polymerize the binder.

According to another distinctive feature, a veil is adhesively bonded to each of the main faces of the mineral wool panel.

Figure 1:
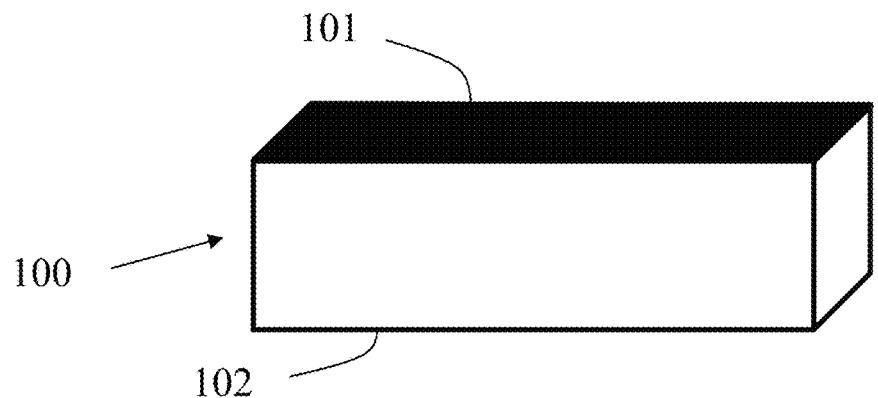
FIG. 1 schematically represents a mineral wool panel,
FIG. 2 schematically shows an equipment for manufacturing a mat, and
FIG. 3 schematically shows an equipment for manufacturing a mat.

The invention relates to a mineral wool panel intended to be used as an acoustic panel and having:
- a surface density of greater than or equal to 3.2 kg/m$^2$, preferably greater than or equal to 4 kg/m$^2$, or else greater than or equal to 4.5 kg/m$^2$, or greater than or equal to 5 kg/m$^2$,
- an air flow resistivity of between 30 and 120 kPa·s/m$^2$, preferably of between 50 and 110 kPa·s/m$^2$, or of between 50 and 100 kPa·s/m$^2$, or else of between 50 and 90 kPa·s/m$^2$, or of between 50 and 80 kPa·s/m$^2$, and
- a Young's modulus of between 0.5 and 4 MPa, preferably of between 0.8 and 4 MPa, more preferably still of between 1.2 MPa and 4 MPa, or of between 1.5 MPa and 4 MPa, or else of between 2 MPa and 4 MPa.

Furthermore, the panel is not cut through the thickness along a plane substantially parallel to its main faces. This means that it results directly from the manufacture of the mineral wool, and more precisely that none of its main faces is a face resulting from cutting through a block of material of greater volume. The fibers at the surface and in the vicinity of the surface have an orientation that is preferentially substantially parallel to said face.

The fact that the panel according to the invention is not split through the thickness, unlike what is known in the prior art, makes it possible to make savings in terms of production time, material cost and waste management.

Moreover, the panel according to the invention has very advantageous acoustic properties owing to a low air flow resistivity (between 30 and 120 kPa·s/m$^2$ preferably between 50 and 110 kPa·s/m$^2$, or between 50 and 100 kPa·s/m$^2$, or else between 50 and 90 kPa·s/m$^2$, or between 50 and 80 kPa·s/m$^2$) and to a high Young's modulus (between 0.5 and 4 MPa, preferably between 0.8 and 4 MPa, more preferably still between 1.2 MPa and 4 MPa, or between 1.5 MPa and 4 MPa, or else between 2 MPa and 4 MPa), which make it an ideal candidate for use as an acoustic panel. Specifically, within the ranges mentioned above, the lower the air flow resistivity, the better the sound absorption, and the higher the Young's modulus, the better the sound insulation.

The surface density of the panel according to the invention, which is greater than or equal to 3.2 kg/m$^2$, gives this panel a satisfactory mechanical strength, which is further improved when the surface density increases. Thus, the surface density of the panel according to the invention is preferably greater than or equal to 4 kg/m$^2$, or else greater than or equal to 4.5 kg/m$^2$, or greater than or equal to 5 kg/m$^2$.

The air flow resistivity is measured according to the ISO 9053 standard.

The Young's modulus is measured according to the ISO 18437 standard and according to the article by C. Langlois, R. Panneton and N. Atalla: Polynomial relations for quasi-static mechanical characterization of isotropic poroelastic materials, J. Acoust. Soc. Am., 110:3032-3040, 2001.

The measurements of the air flow resistivity and of the Young's modulus are carried out on the panel without the front/rear veils.

The mineral wool panel according to the invention may be made from glass wool, by fiberizing by internal centrifugation, or from rock wool, by fiberizing by external centrifugation.

The mineral fibers are crimped to a degree of crimping of between 1.5 and 5. The degree of crimping has an influence on the air flow resistivity and on the Young's modulus. The degree of crimping is preferably between 2 and 5, or between 2.5 and 5, or else between 3 and 5 in order to further decrease the air flow resistivity and increase the Young's modulus. Specifically, crimping favors the orientation of the fibers along a direction Z perpendicular to the main faces of the panel: the higher the degree of crimping, the greater the orientation of the fibers along Z and the more the air flow resistivity is decreased and the Young's modulus increased.

When the panel is made of glass wool, it additionally has a micronaire of between 2.5/5 g and 6/5 g. Preferably, the micronaire is between 3/5 g and 6/5 g, or between 3.5/5 g and 6/5 g, or else between 4/5 g and 5/5 g. Specifically, the more the micronaire increases, the more the air flow resistivity decreases and the more the Young's modulus increases.

The micronaire is representative of the fineness of the glass fibers. The measurement of the micronaire gives a picture of the specific surface area by means of the measurement of the aerodynamic pressure drop when a given quantity of fibers extracted from an unsized batt is subjected to a given pressure of a gas, in general air or nitrogen. This measurement is standard practice in mineral fiber production units, and is carried out according to the DIN 53941 or ASTM D 1448 standard and uses what is called a "micronaire apparatus".

When the panel is made of rock wool, it additionally has a fasonaire of between 200 and 300. Preferably, the fasonaire is between 200 and 290, or between 200 and 280, or else between 200 and 270. Specifically, the more the fasonaire decreases, the more the air flow resistivity decreases and the more the Young's modulus increases.

The fasonaire is representative of the fineness of the rock fibers. The measurement of the fasonaire is a determination of the fineness index of the fibers by a method similar to that of the micronaire according to the ASTM-D-1448 or DIN 53941 standards. The fasonaire is equal to the pressure drop or difference in flow rate of a gas flow passing through a test specimen consisting of a tuft of mineral fibers of given weight (equal to 5 g for the measurements according to the invention). The tuft of fibers, free of binder or any other non-fibrous component, is compressed in a cylindrical chamber of predetermined volume. The gas flow rate being kept constant, the pressure drop across the test specimen is measured with the aid of a water column graduated in conventional units referred to as fasonaires. The fasonaire is thus expressed in millimeters of water column for 5 g (weight of the test specimen).

The mineral wool panel additionally has a veil on each of its main faces, as shown in FIG. 1. FIG. 1 shows a mineral wool panel 100 that includes two opposite veils 101, 102. The veil intended to be facing the side from where the sound to be absorbed originates, referred to as the front veil, has a specific air flow resistance of less than or equal to 1 kPa·s/m, preferably less than or equal to 0.5 kPa·s/m, so as to let as much sound as possible pass through to the mineral wool, which will absorb the sound in order to enable a good sound absorption. The opposite veil, referred to as the rear veil, has a specific air flow resistance of greater than or equal to 1 kPa·s/m, preferably greater than or equal to 5 kPa·s/m, or even greater than or equal to 10 kPa·s/m: it is preferably airtight so as to provide a good sound insulation. An airtight veil has a specific air flow resistance that is infinite, i.e. which is within the limits of what can be measured. The front veil may be painted to improve the esthetics of the panel on the visible face side. The front veil may be adhesively bonded to the front face of the panel after a slight abrading that makes it possible to flatten this face.

The mineral wool panel additionally comprises a weight content of binder of between 2% and 15% of the total weight, preferably between 2% and 10% of the total weight.

The mineral wool panel has a sound absorption $\alpha_w$ of greater than or equal to 0.9. The sound absorption is measured according to the ISO 354 standard. The indicator $\alpha_w$ is then calculated according to the ISO 11654 standard. Throughout the application, the measurements were carried out with a 200 mm high structural plenum.

The mineral wool panel has a sound insulation $D_{nfw}$ of greater than or equal to 38 dB, preferably greater than or equal to 39 dB, or greater than or equal to 40 dB, or else greater than or equal to 41 dB, or greater than or equal to 42 dB. The sound insulation is measured according to the ISO 10848-1 standard. The indicator $D_{nfw}$ is then calculated according to the ISO 717-1 standard. Throughout the application, the measurements were carried out with a 700 mm high structural plenum.

The measurements of sound absorption and insulation are carried out on the panel with the front/rear veils.

The invention also relates to the process for manufacturing the mineral wool panel as described above. The process comprises a step of manufacturing a mat of mineral fibers, by internal centrifugation if they are glass fibers and by external centrifugation if they are rock fibers, then a step of crimping the mat of glass fibers with a degree of crimping of between 1.5 and 5.

Figure 2:
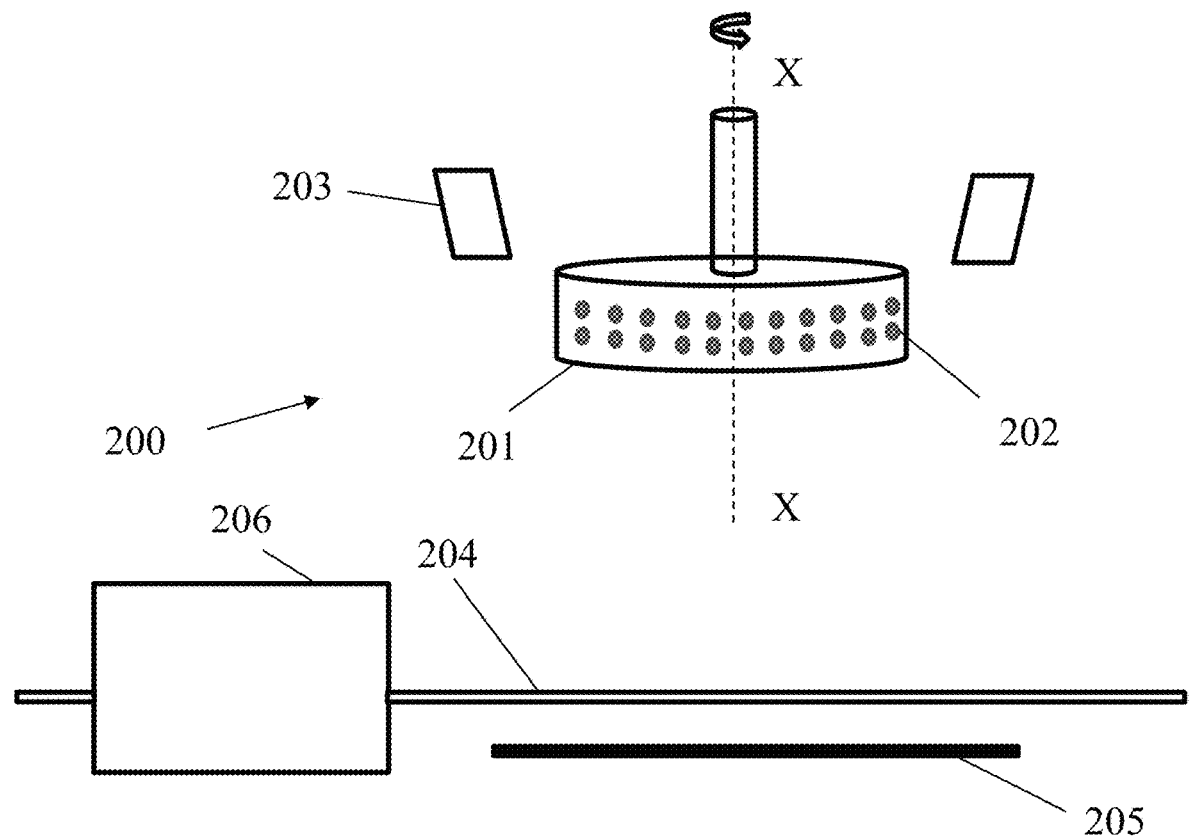

The step of manufacturing the mat of glass fibers by internal centrifugation is carried out using equipment 200 shown in FIG. 2 comprising:
- at least one centrifuge 201 capable of rotating about an axis X, in particular a vertical axis, and the peripheral band of which is pierced by a plurality of orifices 202 for delivering filaments of a molten material,
- a high-temperature gas attenuating means 203 in the form of an annular burner that attenuates the filaments into fibers, and
- a receiving belt 204 associated with suction means 205 for receiving the fibers.

The centrifuge or centrifuges, also referred to as fiberizing spinners, specifically make it possible to form mineral fibers or fibers of other thermoplastic materials, by an internal centrifugation process combined with attenuation by a high-temperature gas flow. Internal centrifugation is applied in particular to the industrial production of glass wool intended to be incorporated for example into the composition of thermal and/or acoustic insulation products. A molten glass stream is introduced into each centrifuge, rotating at high speed and pierced around its periphery by a very large number of orifices through which the glass is projected in the form of filaments owing to the effect of the centrifugal force. These filaments are then subjected to the action of an annular high-velocity high-temperature attenuating flow hugging the wall of the centrifuge, which flow thins said filaments and converts them into fibers. The fibers formed are entrained by this attenuating gas flow to a receiving device generally consisting of a gas-permeable band, referred to as a receiving belt.

During the step of manufacturing the mat of glass fibers, a combination of parameters is regulated, from among at least:
- the viscosity of the molten glass, which is between 820 and 1500 poise, preferably between 950 and 1200 poise,
- the pressure of the burner, between 200 and 1000 mm WC, preferably between 200 and 600 mm WC,
- the total daily output of glass per centrifuge, which is between 14 metric tonnes/day and 23 metric tonnes/day, preferably between 17 and 22 metric tonnes/day,
- the number of holes of each centrifuge, which is between 5000 and 40 000, preferably between 15 000 and 35 000, and
- the rotational speed of the centrifuge at a speed greater than 2000 revolutions/minute.

These parameters make it possible in particular to adjust the surface density and the micronaire of the glass wool panel.

Preferably, the diameter of the orifices of each centrifuge is between 0.5 and 1.1 mm. Each centrifuge preferably has a diameter of between 200 and 800 mm.

Figure 3:
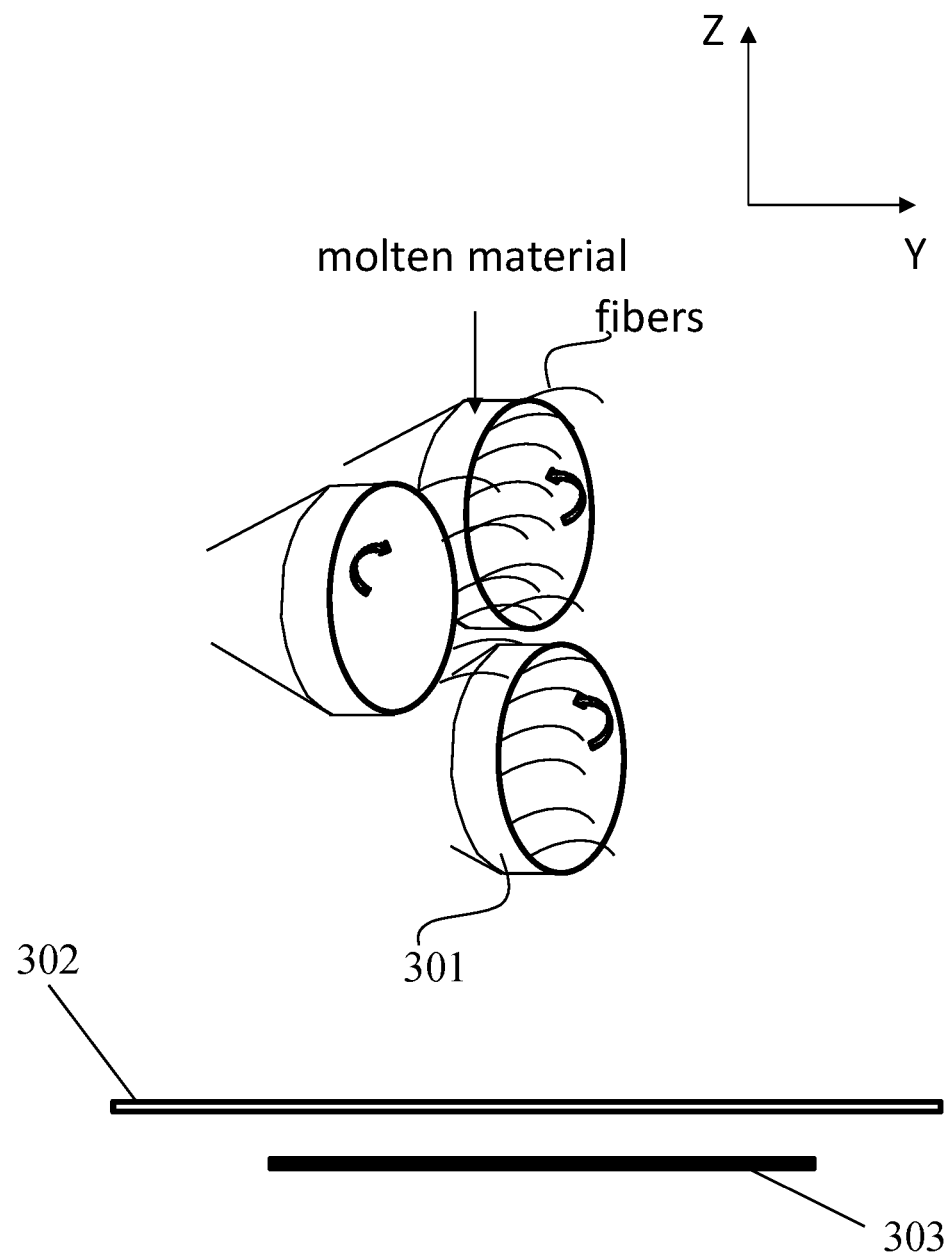

The step of manufacturing the mat of rock fibers by external centrifugation is carried out using equipment 300 shown in FIG. 3 comprising:
- at least three rotors 301 capable of rotating about an axis Y, in particular a horizontal axis, and the contact of which with the molten material makes it possible to deliver fibers, and
- a receiving belt 302 associated with suction means 303 for receiving the fibers.

During the step of manufacturing the mat of rock fibers, a combination of parameters is regulated, from among at least:
- the total daily output of rock, which is between 100 and 250 metric tonnes/day,
- the rotational speed of the rotors, which is between 2000 and 4000 revolutions/min.

These parameters make it possible in particular to adjust the surface density and the fasonaire of the rock wool panel.

Preferably, each rotor has a diameter of between 150 mm and 350 mm.

Moreover, in the two types of processes, binder is projected onto the mineral fibers before they fall onto the receiving belt, with a content of between 2% and 15% of the total weight, preferably of between 2% and 10% of the total weight. The mat of mineral fibers is then passed into a drying oven 206 (as shown in FIG. 2), after crimping, in order to polymerize the binder.

To finalize the product, a veil is adhesively bonded to each of the main faces of the rock wool panel, the specificities of each of the veils having been given above.

A first example according to the invention is a glass wool panel with a density of 117 kg/m³ and a thickness of 50 mm, having an air flow resistivity of 63 kPa·s/m² and a Young's modulus of 2.3 MPa. The micronaire is 4.3/5 g. The degree of crimping is 3.5. The panel comprises a front veil having a specific air flow resistance of 0.3 kPa·s/m and an airtight rear veil. The panel is not cut through its thickness. The sound absorption $\alpha_w$ is 0.9 and the sound insulation $D_{nfw}$ is 42 dB.

A second example according to the invention is a glass wool panel with a density of 102 kg/m³ and a thickness of 52 mm, having an air flow resistivity of 68 kPa·s/m² and a Young's modulus of 0.9 MPa. The micronaire is 3.6/5 g. The degree of crimping is 3.5. The panel comprises a front veil having a specific air flow resistance of 0.3 kPa·s/m and an airtight rear veil. The panel is not cut through its thickness. The sound absorption $\alpha_w$ is 0.95 and the sound insulation $D_{nfw}$ is 41 dB.

A third example according to the invention is a rock wool panel with a density of 130 kg/m$^3$ and a thickness of 38 mm, having an air flow resistivity of 110 kPa·s/m$^2$ and a Young's modulus of 0.9 MPa. The fasonaire is 270. The degree of crimping is 3. The panel comprises a front veil having a specific air flow resistance of 0.3 kPa·s/m and an airtight rear veil. The panel is not cut through its thickness. The sound absorption $\alpha_w$ is 0.9 and the sound insulation $D_{nfw}$ is 40 dB.

Thus, mineral wool panels with both a good sound absorption and a good sound insulation have been able to be manufactured, without cutting through the thickness.

The invention claimed is:

1. A mineral wool panel intended to be used as an acoustic panel and having:
    a surface density of greater than or equal to 3.2 kg/m$^2$,
    an air flow resistivity of between 30 and 120 kPa·s/m$^2$, and
    a Young's modulus of between 0.5 and 4 MPa,
    and the mineral wool panel not being cut through the thickness along a plane substantially parallel to its two main faces, and wherein said mineral wool panel has a panel volume of mineral wool and results directly from manufacture of said mineral wool so that none of said two main faces is a face that results from cutting through a block of mineral wool of volume greater than said panel volume.

2. The panel as claimed in claim 1, additionally having a micronaire of between 2.5/5 g and 6/5 g or a fasonaire of between 200 and 300.

3. The panel as claimed in claim 1, additionally comprising a veil on each main face of the panel.

4. The panel as claimed in claim 3, wherein the veil intended to be facing a side from where the sound to be absorbed originates having a specific air flow resistance of less than or equal to 1 kPa·s/m, and the opposite veil having a specific air flow resistivity of greater than or equal to 1 kPa·s/m.

5. The panel as claimed in claim 1, comprising a weight content of binder of between 2% and 15% of the total weight.

6. The panel as claimed in claim 1, having a sound absorption αw of greater than or equal to 0.9.

7. The panel as claimed in claim 1, having a sound insulation $D_{nfw}$ of greater than or equal to 38 dB.

8. The panel as claimed in claim 1, wherein the surface density is greater than or equal to 4.5 kg/m$^2$, the air flow resistivity is between 50 and 90 kPa·s/m$^2$, and the Young's modulus is between 1.2 MPa and 4 MPa.

9. The panel as claimed in claim 2, wherein the micronaire is between 3.5/5 g and 6/5 g or the fasonaire is between 200 and 280.

10. The panel as claimed in claim 4, wherein the veil intended to be facing the side from where the sound to be absorbed originates has a specific air flow resistance of less than or equal to 0.5 kPa·s/m, and the opposite veil has a specific air flow resistivity of greater than or equal to 10 kPa·s/m.

11. The panel as claimed in claim 5, wherein the weight content of binder is between 2% and 10% of the total weight.

12. The panel as claimed in claim 7, wherein the sound insulation $D_{nfw}$ is greater than or equal to 41 dB.

13. A process for manufacturing a mineral wool panel, comprising:
    manufacturing a mat of mineral fibers by:
        internal centrifugation for glass fibers, using equipment comprising:
            at least one centrifuge capable of rotating about an axis X and a peripheral band of which is pierced by a plurality of orifices for delivering filaments of a molten material,
            a high-temperature gas attenuating means in the form of an annular burner that attenuates the filaments into fibers, and
            a receiving belt associated with suction means for receiving the fibers, or
        external centrifugation for rock fibers, using equipment comprising:
            at least three rotors capable of rotating about an axis Y and a contact of which with the molten material makes it possible to deliver fibers, and
            a receiving belt associated with suction means for receiving the fibers, and
    crimping the mat of mineral fibers with a degree of crimping of between 1.5 and 5, wherein the mineral wool panel is intended to be used as an acoustic panel and has
        a surface density of greater than or equal to 3.2 kg/m$^2$,
        an air flow resistivity of between 30 and 120 kPa·s/m$^2$, and
        a Young's modulus of between 0.5 and 4 MPa,
        and the mineral wool panel not being cut through the thickness along a plane substantially parallel to its two main faces, and wherein said mineral wool panel has a panel volume of mineral wool and results directly from manufacture of said mineral wool so that none of said two main faces is a face that results from cutting through a block of mineral wool of volume greater than said panel volume.

14. The process as claimed in claim 13, wherein, during the of manufacturing of the mat of glass fibers, a combination of parameters is regulated from among at least:
    a viscosity of the molten glass, which is between 820 and 1500 poise,
    a pressure of the burner, which is between 200 and 1000 mm WC,
    a total daily output of glass per centrifuge, which is between 14 metric tonnes/day and 23 metric tonnes/day,
    a number of holes of each centrifuge, which is between 5000 and 40 000, and
    a rotational speed of the centrifuge at a speed greater than 2000 revolutions/minute.

15. The process as claimed in claim 13, wherein a diameter of the orifices of each centrifuge is between 0.5 and 1.1 mm.

16. The process as claimed in claim 13, wherein each centrifuge has a diameter of between 200 and 800 mm.

17. The process as claimed in claim 13, wherein, during the of manufacturing of the mat of rock fibers, a combination of parameters is regulated from among at least:
    a total daily output of rock, which is between 100 and 250 metric tonnes/day,
    a rotational speed of the rotors, which is between 2000 and 4000 revolutions/min.

18. The process as claimed in claim 17, wherein each rotor has a diameter of between 150 mm and 350 mm.

19. The process as claimed in claim 13, wherein binder is projected onto the mineral fibers before the mineral fibers fall onto the receiving belt, with a content of between 2% and 15% of the total weight, the mat of mineral fibers being passed into a drying oven in order to polymerize the binder.

20. The process as claimed in claim 13, wherein a veil is adhesively bonded to each of the main faces of the mineral wool panel.

\* \* \* \* \*